US011572431B2

(12) United States Patent
Haldankar et al.

(10) Patent No.: US 11,572,431 B2
(45) Date of Patent: Feb. 7, 2023

(54) NON-AQUEOUS CROSSLINKABLE COMPOSITION

(71) Applicant: ALLNEX NETHERLANDS B.V., Bergen op Zoom (NL)

(72) Inventors: Gautam Haldankar, Louisville, KY (US); Elwin Aloysius Cornelius Adrianus De Wolf, Hoogerheide (NL); Dirk Emiel Paula Mestach, Nijlen (BE)

(73) Assignee: ALLNEX NETHERLANDS B.V., Bergen op Zoom (NL)

( * ) Notice: Subject to any disclaimer, the term of this patent is extended or adjusted under 35 U.S.C. 154(b) by 274 days.

(21) Appl. No.: 16/754,804

(22) PCT Filed: Aug. 2, 2018

(86) PCT No.: PCT/EP2018/070977
§ 371 (c)(1),
(2) Date: Apr. 9, 2020

(87) PCT Pub. No.: WO2019/072433
PCT Pub. Date: Apr. 18, 2019

(65) Prior Publication Data
US 2021/0189050 A1 Jun. 24, 2021

Related U.S. Application Data

(63) Continuation of application No. 15/728,805, filed on Oct. 10, 2017, now abandoned.

(30) Foreign Application Priority Data

Dec. 14, 2017 (EP) .................................. 17207191

(51) Int. Cl.
| | | |
|---|---|---|
| *C08G 18/24* | (2006.01) | |
| *C08G 18/34* | (2006.01) | |
| *C08G 18/36* | (2006.01) | |
| *C08G 18/62* | (2006.01) | |
| *C08G 18/73* | (2006.01) | |
| *C09D 175/06* | (2006.01) | |
| *C08G 18/38* | (2006.01) | |
| *C08G 18/65* | (2006.01) | |
| *C08G 18/28* | (2006.01) | |
| *C09D 175/04* | (2006.01) | |
| *C08G 18/79* | (2006.01) | |

(52) U.S. Cl.
CPC ........... *C08G 18/34* (2013.01); *C08G 18/242* (2013.01); *C08G 18/281* (2013.01); *C08G 18/348* (2013.01); *C08G 18/36* (2013.01); *C08G 18/3876* (2013.01); *C08G 18/6225* (2013.01); *C08G 18/6541* (2013.01); *C08G 18/73* (2013.01); *C08G 18/792* (2013.01); *C09D 175/04* (2013.01); *C09D 175/06* (2013.01)

(58) Field of Classification Search
CPC .... C08G 18/34; C08G 18/242; C08G 18/348; C08G 18/36; C08G 18/3876; C08G 18/6225; C08G 18/6541
See application file for complete search history.

(56) References Cited

U.S. PATENT DOCUMENTS

| | | | |
|---|---|---|---|
| 3,412,054 A | 11/1968 | Milligan | |
| 3,808,162 A | 4/1974 | George | |
| 4,788,083 A * | 11/1988 | Dammann | C08G 18/089 502/353 |
| 5,352,733 A * | 10/1994 | Hart | C09D 175/06 428/423.1 |
| 2006/0111538 A1* | 5/2006 | Coogan | C08G 18/0823 528/44 |
| 2008/0234410 A1 | 9/2008 | Van Engelen et al. | |
| 2015/0017336 A1 | 1/2015 | Scherer et al. | |

FOREIGN PATENT DOCUMENTS

| | | | |
|---|---|---|---|
| EP | 0 454 219 | 10/1991 | |
| EP | 0735069 B1 * | 7/2002 | C08G 18/65 |
| WO | 2005/019362 | 3/2005 | |
| WO | 2007/020269 | 2/2007 | |
| WO | 2007/020270 | 2/2007 | |
| WO | 2009/024556 | 2/2009 | |
| WO | 2013/131835 | 9/2013 | |

OTHER PUBLICATIONS

International Search Report (ISR) dated Oct. 18, 2018 in International (PCT) Application No. PCT/EP2018/070977.

\* cited by examiner

*Primary Examiner* — Michael L Leonard
(74) *Attorney, Agent, or Firm* — Wenderoth, Lind & Ponack, L.L.P.

(57) ABSTRACT

The present invention relates to a crosslinkable composition comprising a polyol, a polyisocyanate crosslinker, a catalyst for catalysing the reaction between —OH groups of said polyol and —NCO groups of said crosslinker, a tertiary acid of formula RR'R"CCOOH (I), wherein each R, R' and R" group, independently, is an alkyl, alkenyl, aryl or aralkyl group containing at least one carbon atom, with the proviso that two or three of the R, R' and R" groups can be linked to form a ring structure and wherein the R, R' and/or R" groups can be substituted, and optionally, a complexing agent containing at least one —SH group, as well as its use for making coatings having improved application properties.

24 Claims, No Drawings

NON-AQUEOUS CROSSLINKABLE COMPOSITION

The invention relates to a crosslinkable composition comprising a polyol having free hydroxyl groups that can react with a polyisocyanate crosslinker and a catalyst catalysing this reaction and its use in coatings.

Two component polyurethane coatings are well-known in the art. Usually, they are formulated as two-pack systems, the first pack normally containing a polyol resin and the second pack comprising a crosslinking agent, often a polyisocyanate. After mixing of the two packs, the crosslinking reaction starts, resulting in an increase of the viscosity of the composition. Here, the time in which the viscosity is increased by 2 or 4 seconds DIN Flow Cup 4 relative to the initial viscosity is referred to as the working time. The time in which the viscosity is doubled is called the pot life. To allow users of two-pack systems to work as efficiently as possible, both the working time and the pot life should be as long as possible.

Rapid curing of the two-pack composition is often desired to increase the productivity. For environmental as well as economic reasons, drying at elevated temperatures (e.g. 60° C.) should be as short as possible. Alternatively, curing is preferred at lower but still elevated temperatures (e.g. 40° C. instead of 60° C.). Ideally, curing is performed without heating and at ambient temperature. However, when the cure-speed, also called drying time, is increased, often the working time and the pot life are decreased, reducing the quality of the cured material. Therefore there is a need to have a good balance between pot-life and/or working time and drying time and the ratio between pot-life and/or working time to drying time should be as high as possible.

Increasingly, high hardness values are also required shortly after curing. Such a high early hardness will enable earlier handling of an object treated with the crosslinkable composition and thus increasing the productivity. Of course, the crosslinkable composition should be compliant to VOC regulations and preferably, use of highly toxic materials should be avoided. Here, volatile organic compounds, or VOCs are organic chemical compounds whose composition makes it possible for them to evaporate under the conditions of the curing temperature and pressure.

It has been known since long, for example from U.S. Pat. No. 3,808,162 and EP 0454219 that the pot-life of a catalysed composition comprising polyols and polyisocyanates can be increased by the use of acids and/or complexing agents comprising a —SH group. U.S. Pat. No. 3,808,162 describes a series of alkanoic acids, 2-ethylhexanoic acid being the most preferred; the gel times mentioned in this patent are extremely short and unacceptable in many contemporary applications. Furthermore, the described secondary acid nowadays has a radiant man label for potentially damaging an unborn child, which is often unacceptable in today's standards.

EP 0454219 describes compositions comprising a polyol, a polyisocyanate, a volatile acid, especially acetic acid or formic acid, and a complexed catalyst for polyurethane production with much improved pot-life-drying ratio. However, these coatings suffer from very low early hardness and moreover the use of a volatile acid contributes to VOC.

WO 2005/019362 discloses a film-forming composition comprising a polyol, an unblocked polyisocyanate and a volatile carboxylic acid having a boiling point of less than 150° C., especially acetic and propionic acid. Although a good pot-life-drying balance was obtained, the working time of those compositions was extreme short. Moreover, the volatile acids such as described therein contribute to VOC and generate an unpleasant smell during application of the composition.

WO 2007/020270 describes the use of conjugated acids, especially benzoic acid, in order to improve the balance of cure speed, pot-life and appearance properties in compositions wherein a low VOC is required. However, benzoic acid has limited solubility in many organic media. Furthermore, benzoic acid nowadays has a radiant man label for potentially causing damage to the lungs, which is often unacceptable in today's standards.

WO 2013/131835 describes compositions comprising a polyol, a polyisocyanate crosslinker, a metal based catalyst, a SH functional compound, a base having a pKa of at least 7 and an acid, especially benzoic and hexanoic acid, dodecyl and toluene sulfonic acid and dibutylphosphate. Even if coatings with fast drying at ambient temperature and good hardness after 1 day could be obtained, the gel times were very short.

Therefore, a need still exists for a crosslinkable composition which provides an improved pot-life-drying time ratio, high early hardness as well as a long working time. Moreover the composition should be curable below ambient temperature, at ambient temperature or at elevated temperature.

Furthermore, the composition should provide a good balance of other important properties such as (outdoor) durability, resistance to sunlight, resistance to several chemicals such as moisture, acid rain and other contaminants, mechanical properties and have an excellent appearance. Importantly, the composition should be able to be formulated without the use of materials labelled with a radiant man label and should have a low content of volatile organic components VOC in order to comply with current and future regulations relating to the emission of such components.

Applicants have found compositions that overcome the drawbacks of previously described compositions and that provide the combination of properties as described here above. Therefore the invention relates to a crosslinkable composition comprising a) at least one polyol having free —OH (hydroxyl) groups, b) at least one polyisocyanate crosslinker containing free —NCO (isocyanate) groups, c) at least one catalyst for catalysing the reaction between —OH groups of said polyol a) and —NCO groups of said crosslinker b), d) at least one tertiary acid of formula RR'R"CCOOH (I), wherein each R, R' and R" group, independently, is an alkyl, alkenyl, aryl or aralkyl group containing at least one carbon atom, with the proviso that two or three of the R, R' and R" groups can be linked to form a ring structure, and wherein the R, R' and/or R" groups can be substituted, and wherein the total number of carbon atoms in the R, R' and R" groups is the range of from 3 to 40, and e) optionally, at least one complexing agent containing at least one —SH group.

It has been found that such crosslinkable composition allows to obtain a coating composition having an improved pot-life-drying ratio, balanced with a long working time and good (early) hardness. The composition is highly suitable to be formulated at a low content of volatile organic components and without highly toxic material. Furthermore, the resulting crosslinked material provides good resistance to chemicals and sunlight, is durable, has good mechanical properties and has an excellent appearance. It is particularly surprising that use of tertiary acids, in combination or not in combination with a complexing agent containing at least one —SH group, provides a better balance between pot-life-drying ratio, (early) hardness and working time compared to the primary, secondary or conjugated acids described in the prior art.

The composition according to the invention is preferably a so-called non-aqueous composition, generally a composition comprising less than 10% of water, preferably less than 5% of water, more preferably less than 1% of water or even substantially free of water.

The polyols a) used in the composition according to the invention are usually polymers comprising at least 2 —OH groups. However the compositions according to the invention can comprise, besides the polymeric polyols a), also some monomers and/or oligomers. Suitable monomeric and/or oligomeric polyols include compounds comprising at least two free hydroxyl groups, such castor oil, alkylenediols and trimethylol propane.

The polyols a) are preferably selected from polyester polyols, polyacrylate polyols, polycarbonate polyols, polyether polyols, polyurethane polyols, melamine polyols, and mixtures and hybrids thereof. Such polymers are generally known to the skilled person and are commercially available.

Of the wide variety of potentially suitable polyols a), preferred are the polyester polyols and polyacrylic polyols and mixtures and hybrids thereof. Suitable polyester polyols can be obtained, for instance, by the polycondensation of one or more di- and/or higher functional hydroxyl compounds with one or more di- and/or higher functional carboxylic acids, optionally in combination with one or more monofunctional carboxylic acids and/or hydroxyl functional compounds. As non-limiting examples, di- and/or higher functional hydroxyl compounds can be one or more alcohols selected from ethylene glycol, neopentyl glycol, trimethylol propane and pentaerythritol. As non-limiting examples, the di- and/or higher functional carboxylic acids are one or more selected from the group consisting of adipic acid, 1,4-cyclohexyl dicarboxylic acid, hexahydrophthalic acid, succinic acid, and functional equivalents thereof. Alternatively, polyester polyols can be prepared from di- and/or higher functional hydroxyl compounds and from anhydrides and/or C1-C4 alkyl esters of the acids.

Suitable acrylic polyols can be obtained, for instance, by the (co)polymerization of hydroxyl-functional acrylic monomers with other ethylenically unsaturated co-monomers in the presence of a free radical initiator. As a non-limiting example, the (meth)acrylic polyol can include residues formed from the polymerization of one or more hydroxyalkyl esters of (meth)acrylic acid, such as for example hydroxyethyl (meth)acrylate, hydroxypropyl (meth)acrylate, polyethylene glycol esters of (meth)acrylic acid, polypropylene glycol esters of (meth)acrylic acid, and mixed polyethylene glycol and polypropylene glycol esters of (meth)acrylic acid. The acrylic polyol further preferably comprises monomers not containing hydroxyl groups such as methyl (meth)acrylate, tert-butyl (meth)acrylate, isobornyl (meth)acrylate, isobutyl (meth)acrylate, (substituted) cyclohexyl (meth)acrylate, (meth)acrylic acid. The acrylic binder optionally comprises non-(meth)acrylate monomers such as styrene, vinyl toluene, vinyl esters of branched monocarboxylic acids, maleic acid, fumaric acid, itaconic acid, crotonic acid and monoalkylesters of maleic acid.

The polyol a) used in the composition according to the present invention preferably has a hydroxyl value, as determined according to the method ASTM E222-17, in the range of 20 to 1,000 mg KOH per gram of polyol, more preferred in the range of 50 to 500 mg KOH per gram of polyol and most preferred in the range of 100 to 250 mg KOH per gram of polyol a).

The polyol a) used in the composition according to the present invention is preferably a polymer, and more preferably a polymer polyol having an acid value of 15 mg KOH/gram of polyol a) or less. It is especially preferred that the acid value of the polyol is at most 10 mg KOH/gram of polyol a), more preferred the acid value of the polyol is at most 6 mg KOH/gram of polyol a). The acid value is measured according to ISO 3682-1996.

The polyol a) is usually present in the composition at a level in the range of 10 to 90, more preferred 20 to 80, most preferred 30 to 70, percent by weight based on the total amount of polyol a), crosslinker b), catalyst c), tertiary acid d) and, if present, complexing agent e) and/or anti-oxidant f1) and/or radical scavenger f2).

The crosslinkable composition comprises at least one polyisocyanate crosslinker b) preferably comprising at least two free —NCO (isocyanate) groups. The crosslinker b) is usually selected from (cyclo)aliphatic and/or aromatic polyisocyanates comprising at least 2 —NCO groups and mixtures thereof. The crosslinker b) is preferably selected from hexamethylene diisocyanate, 2,4,4-trimethyl hexamethylene diisocyanate, 1,2-cyclohexylene diisocyanate, 1,4-cyclohexylene diisocyanate, 4,4'-dicyclohexylene diisocyanate methane, 3,3'-dimethyl-4,4'-dicyclohexylene diisocyanate methane, norbornane diisocyanate, m- and p-phenylene diisocyanate, 1,3- and 1,4-bis (isocyanate methyl) benzene, xylylene diisocyanate, α,α,α',α'-tetramethyl xylylene diisocyanate (TMXDI), 1,5-dimethyl-2,4-bis (isocyanate methyl) benzene, 2,4- and 2,6-toluene diisocyanate, 2,4,6-toluene triisocyanate, 4,4'-diphenylene diisocyanate methane, 4,4'-diphenylene diisocyanate, naphthalene-1,5-diisocyanate, isophorone diisocyanate, 4-isocyanatomethyl-1,8-octamethylene diisocyanate, and mixtures of the aforementioned polyisocyanates. Other preferred isocyanate crosslinkers are adducts of polyisocyanates, e.g., biurets, isocyanurates, imino-oxadiazinediones, allophanates, uretdiones, and mixtures thereof. Examples of such adducts are the adduct of two molecules of hexamethylene diisocyanate or isophorone diisocyanate to a diol such as ethylene glycol, the adduct of 3 molecules of hexamethylene diisocyanate to 1 molecule of water, the adduct of 1 molecule of trimethylol propane to 3 molecules of isophorone diisocyanate, the adduct of 1 molecule of pentaerythritol to 4 molecules of toluene diisocyanate, the isocyanurate of hexamethylene diisocyanate (available under the trade name DESMODUR® (E) N3390 or TOLONATE® HDT-LV), a mixture of the uretdione and the isocyanurate of hexamethylene diisocyanate (available under the trade name DESMODUR® N3400), the allophanate of hexamethylene diisocyanate (available under the trade name DESMODUR® LS 2101), and the isocyanurate of isophorone diisocyanate (available under the trade name VESTANAT® T1890). Furthermore, (co)polymers of isocyanate-functional monomers such as α,α'-dimethyl-m-isopropenyl benzyl isocyanate are suitable for use. If desired, it is also possible to use hydrophobically or hydrophilically modified polyisocyanates to impart specific properties to the coating.

The crosslinker b) is usually present in the composition at a level in the range of 10 to 90, more preferred 20 to 80, most preferred 30 to 70, percent by weight based on the total amount of polyol a), crosslinker b), catalyst c), tertiary acid d) and, if present, complexing agent e) and/or anti-oxidant f1) and/or radical scavenger f2).

The crosslinkable composition according to the invention usually comprises the polyol a) and polyisocyanate crosslinker b) in an amount such that the equivalent ratio of isocyanate-functional groups to hydroxyl groups is between 0.5 and 4.0, preferably between 0.7 and 3.0, and more preferably between 0.8 and 2.5.

The catalyst c) is preferably a catalyst that promotes the reaction of isocyanate groups and hydroxyl groups. Such catalysts are known to the skilled person. The catalyst is generally used in an amount of 0.001 to 10 weight %, preferably 0.002 to 5 weight %, more preferably in an amount of 0.01 to 1 weight %, based on the total amount of polyol a), crosslinker b), catalyst c), tertiary acid d) and, if present, complexing agent e) and/or anti-oxidant f1) and/or radical scavenger f2).

The catalyst preferably contains a metal-based catalyst. Preferred metals in the metal-based catalyst include tin, bismuth, zinc, zirconium and aluminium. Preferred metal-based catalysts c) are carboxylate complexes of the aforementioned metals, especially tin (II) carboxylates, dialkyl tin (IV) carboxylates, bismuth carboxylates, zinc carboxylates or aluminium carboxylates or mixtures thereof, and more preferably dialkyl tin dicarboxylates, bismuth carboxylates or zinc carboxylates. Preferred metal-based catalysts c) used in the present invention are tin, bismuth and zinc carboxylates, more specifically preferred are dimethyl tin dilaurate, dimethyl tin diversatate, dimethyl tin dioleate, dibutyl tin dilaurate, dioctyl tin dilaurate, and tin octoate, zinc 2-ethylhexanoate, zinc neodecanoate, bismuth 2-ethylhexanoate, bismuth neodecanoate. Particularly preferred are dibutyl tin dilaurate, dioctyl tin dilaurate and zinc 2-ethylhexanoate, as well as mixtures thereof. Also suitable are dialkyl tin di(alkylsulphides), dialkyl tin maleates, and dialkyl tin acetates. It is also possible to use mixtures and combinations of metal-based catalysts. The catalyst c) can also comprise a metal-based catalyst as described here above in combination with one or more tertiary amine catalysts. The tertiary amine catalysts are preferably selected from 1,4-diaza (1,4-diazabicyclo[2.2.2]octane); N,N-dimethylamino propylamine; N-ethylmorpholine; N,N-dimethylcyclohexylamine; N,N,N',N',N''-pentamethyldiethylenetriamine; 3-dimethylamino-N,N-methyl propionamide; 3-[4-[3-(dimethylamino)-3-oxopropyl]; 3-(dimethylamino)-N,N-dimethylbutanamide and mixtures of any of those.

The tertiary acid d) used in the composition according to the present invention has the general formula RR'R''CCOOH (I) wherein each R, R' and R'' group, independently, is an alkyl, alkenyl, aryl or aralkyl group containing at least one carbon atom, with the proviso that two or three of the R, R' and R'' groups can be linked to form a ring structure and wherein the R, R' and/or R'' groups can be substituted, and wherein the total number of carbon atoms in the R, R' and R'' groups are in the range of from 3 to 40.

Preferred are tertiary acids d) of this formula (I) wherein the total number of carbon atoms in the R, R' and R'' groups are in the range of from 3 to 30, more preferably from 3 to 18, and most preferably from 3 to 8. R, R' and R'' can be the same or can be different and include linear as well as branched groups as well as groups which are substituted with one or more functional groups such as —OH groups, primary, secondary or tertiary amine groups, carboxylic acids groups, ester groups, ether groups, —SH groups. Alternatively, one of R' or R'' can be a carboxylic acid group.

Preferred tertiary acids d) are those of formula (I) wherein R is an alkyl group, more preferably a methyl group and wherein R' and R'' are alkyl or alkenyl, more preferably alkyl, groups which may be linked together to form a ring structure, or which may be substituted with one or more hydroxyl group. Particularly preferred tertiary acids are those wherein R is a methyl or ethyl group and where the total number of carbon atoms of groups R' and R'' is from 2 to 17, most preferred from 2 to 7, especially from 2 to 5, and where R' and/or R'' is non-substituted or substituted with only one hydroxyl group.

Particularly preferred tertiary acids are those wherein R is a methyl group and where the total number of carbon atoms of groups R' and R'' is from 2 to 17, most preferred from 2 to 7, especially from 2 to 5.

Tertiary acids d) with the general formula RR'R''CCOOH as defined here above are usually not volatile; the acids d) generally have a vapor pressure between 0 and 60° C. as calculated from the Clapeyron equation of at least one order of magnitude lower compared to acetic acid, calculated at the same temperature.

Non-limiting examples of tertiary acids that can be used in the composition according to the invention are neodecanoic acid, versatic acid, 3-hydroxy-2,2-dimethylpropionic acid, 2,2-bis(hydroxymethyl)propionic acid, abietic acid, 1-methyl cyclohexanoic acid, dimetylmalonic acid, ethylmethylmalonic acid, diethylmalonic acid, 2,2-dimethylsuccinic acid, 2,2-diethylsuccinic acid, 2,2-dimethylglutaric acid, 2,2-dimethylpropionic acid, 2,2-dimethylbutyric acid, 2-ethyl-2-methyl butyric acid, 2,2-diethylbutyric acid, 2,2-dimethylvaleric acid, 2-ethyl-2-methylvaleric acid, 2,2-diethylvaleric acid, 2,2-dimethylhexanoic acid, 2,2-diethylhexanoic acid, 2,2-dimethyloctanoic acid, 2-ethyl-2,5-dimethylhexanoic acid, 3-methylisocitric acid, 4,4-dimethylaconitic acid, 1-methylcyclopentane carboxylic acid, 1,2,2-trimethyl-1,3-cyclopentane dicarboxylic acid, 1-methylcyclohexane carboxylic acid, 2-methylbicyclo[2.2.1]-5-heptene-2-carboxylic acid, 2-methyl-7-oxabicyclo[2.2.1]-5-heptene-2-carboxylic acid, 1-adamantane carboxylic acid, bicyclo[2.2.1]heptane-1-carboxylic acid and bicyclo[2.2.2]octane-1-carboxylic acid or mixtures thereof.

The amount of tertiary acid d) present in the composition is generally in the range of 0.005 to 0.5 mmol of tertiary acid d) per gram of polyol a), preferably in the range of 0.02 to 0.3 mmol of tertiary acid d) per gram of polyol a), more preferably in the range of 0.04 to 0.25 mmol of tertiary acid d) per gram of polyol a).

The tertiary acid d) is generally used in an amount of 0.001 to 10, preferably from 0.002 to 5, more preferably from 0.01 to 2.5, % of weight of tertiary acid d), based on the total amount of polyol a), crosslinker b), catalyst c), tertiary acid d) and, if present, complexing agent e) and/or anti-oxidant f1) and/or radical scavenger f2).

In the composition according to the invention, also primary and/or secondary, preferably non-polymer bonded, acids may be used in addition to the tertiary acids d). If used, the quantity of the primary and/or secondary acid does preferably not exceed 100 mol % of the quantity of tertiary acid. When used, the quantity of primary and/or secondary acid is preferably in the range of 1 to 100 mol % of the quantity of tertiary acid. Examples of primary and secondary acids are acetic acid, propionic acid, benzoic acid, isononanoic acid, 2-ethylhexanoic acid, pentanoic acid and 3-methylbutanoic acid and/or mixtures thereof.

The composition according to the present invention preferably also comprises at least one complexing agent e) containing at least one —SH group. This complexing agent e) is generally an organic compound containing one or more —SH groups. Preferred complexing agents e) are those of the general formula R—SH (II), wherein R can be an alkyl, alkenyl, aryl or aralkyl group. The —SH group can be a primary, secondary or tertiary —SH group. R can be a linear, cyclic or branched group and can comprise one or more other functional groups such as for example hydroxyl groups, primary, secondary or tertiary amine groups, silane or siloxane groups, ether groups, ester groups, carboxylic acid groups. Preferably R is a linear or branched alkyl group of the general formula —$C_nH_{2n+1}$ wherein n is from 4 to 40, more preferably from 8 to 30. Examples are n-$C_{12}H_{25}$SH, n-$C_{16}H_{33}$SH, linear or branched molecules of formula $C_{11}H_{23}$SH, $C_{12}H_{25}$SH and $C_{13}H_{27}$SH, as well as mixtures thereof, and $(CH_3)_2(iPr)C—C(CH_3)_2—C(CH_3)_2SH$. If R contains more than one other functional groups, these can be different or the same. Particularly hydroxyl or ester groups are preferred as other functional group. In case of R containing an ester group, R preferably has the general formula —$(CH_2)_n(C=O)O—R'$. Herein, n can be chosen in the range of 1-20, preferably in the range of 1-10 and particularly preferred n is 1 or 2. R' can be any alkyl, alkenyl, aryl or aralkyl group, preferably containing from 1 to 24 carbon atoms, such as for example butyl, 2-ethylhexyl, iso-octyl, tridecyl, octadecyl. Particularly preferred are complexing agents of formula HS—$(CH_2)_n(C=O)O—R'$ (III), wherein n is 1 or 2 and wherein R' is an alkyl group containing from 3 to 20 carbon atoms.

The complexing agent e) can contain multiple —SH groups. Preferred are those of formula HS—$(CH_2)_x$—SH (IV) wherein x=1 to 20, those of formula $(HSCH_2)_{4-m}C(CH_2SCH_2CH_2SH)_m$ (V) wherein m=1 to 4 and similar compounds such as for example described in patents EP 0665219 and EP 0435306. Other complexing agents e) which are particularly preferred are esters from SH-functional acids, especially SH-functional carboxylic acids, and a polyol. Not necessarily limiting to condensation reaction synthesis only, —such products can be obtained by the formation of (poly)ester bonds between for example $HS(CH_2)_nCOOH$ (wherein n=1 to 20) and a polyol. Preferred are those which are the reaction products of carboxylic acids of formula $HS(CH_2)_nCOOH$ (VI) wherein n is from 1 to 20 and a polyol having an OH-functionality of 2 or more. In this case, the polyol has usually an OH-functionality of 2 or more and can be monomeric, oligomeric or polymeric. Non-limiting examples of such polyols can be glycol, glycerol, trimethylolpropane, neopentyl glycol, pentaerythritol, dipentaerythritol, ethoxylated trimethylolpropane, tri(hydroxyethyl)isocyanurate, castor oil, OH functional polyester, OH functional polyacrylate, polycaprolactone, OH functional polycarbonate, polymers based on diepisulphide monomers as described in U.S. Pat. No. 6,486,298.

Mixtures of different complexing agents e) can be used, including mixtures of compounds e) having one SH moiety with those containing more than one sulphur-hydrogen bond.

The amount of complexing agent e) in the composition according to the invention is generally such that the molar equivalents of —SH groups per molar equivalent of metal in the metal based catalyst c) is in the range of 1 to 20 molar equivalents of SH per equivalent of metal from the metal based catalyst c), preferably in the range of 2 to 10 molar equivalents of SH per equivalent of metal from the metal based catalyst.

The complexing agent e) is preferably used in an amount of 0.001 to 1, more preferably from 0.01 to 0.5, most preferably from 0.02 to 0.3, % of weight of complexing agent e), based on the total amount of polyol a), crosslinker b), catalyst c), tertiary acid d) and complexing agent e) and/or anti-oxidant f1) and/or radical scavenger f2).

The crosslinkable composition may further contain reactive diluents. Reactive diluents generally are monomeric, oligomeric or polymeric compounds used to reduce the viscosity of polyol a) and which can react with polyol a) and/or crosslinker b). Preferably, reactive diluents are not volatile and therefore do not contribute to the total volatile organic content of the composition. Preferred reactive diluents are monomeric, oligomeric or polymeric compounds comprising one —OH group or monomeric or oligomeric compounds comprising 2 to 5 —OH groups or mixtures thereof which can react with crosslinker b), usually under the influence of the catalyst c) and which are used to reduce the viscosity of polyol a). Preferably, the coating composition comprises less than 30 g of reactive diluent per 100 g of polyol a), more preferably less than 20 g per 100 g of polyol a), and most preferably 15 g per 100 g of polyol a) or less.

The composition according to the invention may optionally comprise one or more volatile organic compounds. In general, these are compounds with a boiling point at atmospheric pressure of 200° C. or less and these are used to dilute the composition to a viscosity suitable to apply the composition. If necessary, a viscosity suitable to apply the composition can therefore be obtained by using a reactive diluent or by using volatile organic compounds, or a mixture of a reactive diluent and volatile organic compounds. Preferably, the coating composition comprises less than 500 g/l of volatile organic compound based on the total composition, more preferably less than 480 g/l, and most preferably 420 g/l or less. Examples of suitable volatile organic compounds are hydrocarbons, such as toluene, xylene, SOLVESSO® 100, ketones, terpenes, such as dipentene or pine oil, halogenated hydrocarbons, such as dichloromethane, ethers, such as ethylene glycol dimethyl ether, esters, such as ethyl acetate, ethyl propionate, n-butyl acetate or ether esters, such as methoxypropyl acetate or ethoxyethyl propionate. Also mixtures of these compounds can be used.

If so desired, it is possible to include one or more so-called "exempt solvents" in the composition. An exempt solvent is generally defined as being a volatile organic compound that does not participate in an atmospheric photochemical reaction to form smog. It can be an organic solvent, but it takes so long to react with nitrogen oxides in the presence of sunlight that the Environmental Protection Agency of the United States of America considers its reactivity to be negligible. Examples of exempt solvents that are approved for use in paints and coatings include acetone, methyl acetate, parachlorobenzotrifluoride (commercially available under the name OXSOL® 100), and volatile methyl siloxanes. Also tertiary butyl acetate is being considered as an exempt solvent.

The non-volatile content of the composition, usually referred to as the solid content, preferably is higher than 40 weight-% based on the total composition, more preferably higher than 45 weight-%, and most preferably higher than 50 weight-%. By solid content of the composition is understood the amount of matter that results after applying and curing or crosslinking the composition after evaporation of the volatile organic compounds. The crosslinkable composition according to the invention may be used and applied without volatile components, in particular when one or more reactive diluents as described here above are used or in applications where higher application viscosity is needed.

In addition to the components described above, other compounds can be present in the crosslinkable composition according to the present invention. Such compounds may be binders other than polyol a) and/or reactive diluents, and may comprise reactive groups which may be crosslinked with the aforesaid polyols a) and/or crosslinkers b). Examples of such other compounds are ketone resins, and latent amino-functional compounds such as oxazolidines, ketimines, aldimines, and diimines. These and other compounds are known to the skilled person and are mentioned, int al., in U.S. Pat. No. 5,214,086.

The crosslinkable composition may further comprise other ingredients, additives or auxiliaries commonly used in coating compositions, such as pigments, dyes, surfactants, pigment dispersion aids, levelling agents, wetting agents, anti-cratering agents, antifoaming agents, matting agents, anti-sagging agents, heat stabilizers, light stabilizers, UV absorbers, antioxidants, radical inhibitors and fillers.

The crosslinkable composition preferably comprises at least one anti-oxidant f1). Anti-oxidants used in coating compositions are well known and are generally chosen from phenolic type anti-oxidants, phosphite based anti-oxidants, phosphonite type anti-oxidant, thioethers and blends thereof. The crosslinkable composition according to the invention preferably contains at least one anti-oxidant of the phosphite or phosphonite type.

Optionally, the crosslinkable composition also comprises at least one radical scavenger f2). Radical scavengers used in coating compositions are well known. The crosslinkable composition can comprise any type of radical scavenger; preferably the crosslinkable composition comprises a radical scavenger based on a sterically hindered phenol moiety, more preferably based on esters comprising a 3-(3,5-di-tert-butyl-4-hydroxyphenyl)propionate fragment.

Anti-sagging agents are rheologically active compounds providing thixotropic properties to the crosslinkable composition. These anti-sagging agents are well known and are generally chosen from clay anti-sagging agents, silica-based anti-sagging agents, microgel anti-sagging agents, amide based anti-sagging agents or anti-sagging agents based on polyurea products. If the crosslinkable composition comprises an anti-sagging agent, preferably the crosslinkable composition comprises an anti-sagging agents based on a polyurea product, more preferably the crosslinkable composition comprises a polyurea product typically prepared from the reaction of a polyisocyanate with a monoamine, most preferably from the reaction of benzylamine or methoxypropyl amine and hexamethylene diisocyanate or its isocyanurate.

The coating composition preferably comprises
from 10 to 90, preferably from 20 to 80, more preferably from 30 to 70, % of weight of polyol a),
from 10 to 90, preferably from 20 to 80, more preferably from 30 to 70, % of weight of polyisocyanate crosslinker b),
from 0.001 to 10, preferably from 0.002 to 5, more preferably from 0.005 to 1, % of weight of catalyst c)
from 0.001 to 10, preferably from 0.002 to 5, more preferably from 0.01 to 2.5, % of weight of tertiary acid d), and
optionally, from 0.001 to 1, preferably from 0.01 to 0.5, more preferably from 0.02 to 0.3, % of weight of complexing agent e),
optionally, from 0.05 to 1.5, preferably from 0.2 to 1, % of at least one anti-oxidant f1), more preferably a phosphite or phosphonite type anti-oxidant.
optionally, from 0.05 to 1.5, preferably from 0.2 to 1, % of at least one radical scavenger f2), more preferably a radical scavenger based on a sterically hindered phenol.

based on the total amount of polyol a), crosslinker b), catalyst c), tertiary acid d) and, if present, complexing agent e), anti-oxidant f1) and radical scavenger f2).

The coating composition preferably comprises from 20 to 100 weight % of a total amount of polyol a), crosslinker b), catalyst c), tertiary acid d), and if present, complexing agent e), anti-oxidant f1) and/or radical scavenger f2), based on the total amount of solids of the coating composition.

The crosslinkable composition can suitably be prepared by a process comprising mixing the polyol a) with the catalyst c) and/or the tertiary acid d), to form a binder module, and mixing said binder module with the crosslinker b). The complexing agent e) can be added separately or, preferably, is added to the binder module. The anti-oxidant f1) and/or radical scavenger f2) can be added separately, or, preferably, can be added to the binder module.

As is usual with crosslinkable compositions comprising a hydroxyl-functional binder and an isocyanate-functional crosslinker, the composition according to the invention has a limited pot-life. Therefore, the composition is suitably provided as a multi-component composition, for example as a two-component composition or as a three-component composition, wherein the polyol a) and the crosslinker b) are parts of at least two different components. Therefore, the invention also relates to a kit of parts for preparing a crosslinkable composition, comprising
  i. a binder module comprising at least one polyol a) and at least one tertiary acid d), and optionally at least one catalyst c) and/or complexing agent e) and/or anti-oxidant f1) and/or
  radical scavenger f2)
  ii. a crosslinker module comprising at least one polyisocyanate crosslinker b).

Alternatively, the kit of parts may comprise three components, comprising
  i. a binder module comprising the polyol a),
  ii. a crosslinker module comprising the crosslinker b), and
  iii. a diluent module comprising a volatile organic diluent,
wherein the catalyst c), and/or one or more tertiary acids d) and optionally one or more components e) and optionally one or more anti-oxidants f1) and/or radical scavengers f2), are distributed over modules i), ii) or iii), and wherein at least one of the modules comprises the catalyst c) and wherein at least one of the modules comprises the tertiary acid d).

The other components of the crosslinkable composition may be distributed in different ways over the modules as described above, as long as the modules exhibit the required storage stability. Components of the crosslinkable composition which react with each other upon storage are preferably not combined in one module. If desired, the components of the coating composition may be distributed over even more modules, for example 4 or 5 modules.

The present invention also relates to a binder module comprising a polyol a) and at least one tertiary acid d) and, optionally at least one complexing agent e) and, optionally at least one anti-oxidant f1) and/or radical scavenger f2), as described here above. The binder module preferably contains at least one anti-oxidant f1), especially at least one phosphite or phosponite type anti-oxidant and/or one radical scavenger f2), preferably of the type based on sterically hindered phenol.

The binder module preferably comprises
from 30 to 95, preferably from 40 to 85, more preferably from 50 to 80, % of weight of polyol a), optionally, from 0.001 to 10, preferably from 0.002 to 5, more preferably from 0.005 to 1, % of weight of catalyst c)

from 0.05 to 12, preferably from 0.1 to 6, more preferably from 0.2 to 3.0, % of weight of tertiary acid d), and optionally, from 0.001 to 1, preferably from 0.01 to 0.7, more preferably from 0.02 to 0.5, % of weight of complexing agent e), optionally, from 0.1 to 3, preferably from 0.3 to 2% of at least one anti-oxidant f1), more preferably a phosphite or phosphonite type anti-oxidant.

optionally, from 0.1 to 3, preferably from 0.3 to 2% of at least one radical scavenger f2), more preferably a type of radical scavenger based on a sterically hindered phenol based on the total amount of polyol a), tertiary acid d) and, if present, catalyst c), complexing agent e) and/or anti-oxidant f1) and/or radical scavenger f2).

The crosslinkable composition of the invention can be applied to any substrate. The substrate may be, for example, metal, e.g., iron, steel, tinplate and aluminum, plastic, wood, glass, synthetic material, paper, leather, concrete or another coating layer. The other coating layer can be comprised of the coating composition of the current invention or it can be a different coating composition such as for example a solvent borne or waterborne basecoat or a primer; this primer can be any primer, but those skilled in the art know that often epoxy based or polyurethane based primers are often used in various fields of application. The coating compositions of the current invention show particular utility as clear coats, base coats, pigmented top coats, primers, and fillers.

The crosslinkable composition according to the invention is very suitable for use as a clear coat for vehicle refinishes or automotive OEM. A clear coat is essentially free of pigments and is transparent for visible light. However, the clear coat composition may comprise matting agents, for example silica based matting agents, to control the gloss level of the coating.

When the crosslinkable composition of the invention is a clear coat, it is preferably applied over a colour- and/or effect-imparting base coat. In that case, the clear coat forms the top layer of a multi-layer lacquer coating such as typically applied on the exterior or interior of automobiles. The base coat may be a water borne base coat or a solvent borne base coat. The crosslinkable composition of the current invention is also suitable as pigmented topcoat for protective coatings to coat objects such as bridges, pipelines, industrial plants or buildings, oil and gas installations, or ships. The compositions are particularly suitable for finishing and refinishing automobiles and large transportation vehicles, such as trains, trucks, buses, and airplanes. Also, the crosslinkable composition of the current invention can be used in flooring applications. In general, the crosslinkable composition of the current invention can be applied by spraying, such as for example pneumatic spraying, electrostatic spraying, airless spraying or airmix spraying, brushing, draw-down, pouring, casting or any other method to transfer a composition to a substrate.

Therefore, the invention also relates to a method of providing a coating, preferably a coating for at least a part of an object, for example the surface of a transportation vehicle, wherein the method comprises the steps of applying a coating composition according to the invention to at least a part of the object, for example the exterior surface of a transportation vehicle, and curing the applied coating composition, usually in a temperature range of 5 to 180° C., preferably of 5 to 150° C. and more preferably from 5 to 100° C. The curing step can advantageously be carried out at medium temperatures, for example from 60 to 80° C. or even at temperatures lower or equal to 40° C. or ambient temperature. The crosslinkable composition of the invention can likewise be used in non-coating applications such as for example adhesives, composites, sealants and inks.

EXAMPLES

A polyacrylate polyol (Resin A) was prepared from the polymerization of a mixture of hydroxy ethyl methacrylate, hydroxy ethyl acrylate, butyl acrylate, isobornyl methacrylate, and styrene. Resin A had a hydroxyl number of 135 mg KOH/g (on non volatile content), an acid number of 1 mg KOH/g (on non-volatile content), a $M_w$ 3,100 and a $M_n$ 1,650 (GPC, polystyrene standard). The polyacrylate polyol was dissolved in butyl acetate yielding a solution with a non-volatile content of 74% by weight.

SETATHANE® D 1150 is a castor oil based polyol supplied by allnex with a hydroxyl value of 155 mg KOH/g and an acid value <2 mg KOH/g.

TINUVIN® 292 is a mixture of two active tertiary amine ingredients: bis(1,2,3,6,6-pentamethyl-4-piperidinyl)sebacate and methyl(1,2,2,6,6-pentamethyl-4-piperidinyl)sebacate. TINUVIN® 1130 is a benzotriazole-based UV absorber.

TOLONATE® HDT-LV is a hexamethylene diisocyanate based trimer.

NOURACID® LE80 is a linseed oil fatty acid.

FINMA-SORB® 430 is a molecular sieve supplied by Finma Chemie GmbH

Barytes EWO: barium sulphate extender, supplied by Sachtleben Chemie GmbH (

R-KB-2 is Sachtleben R-KB-2 pigment (titanium dioxide), supplied by Sachtleben Chemie GmbH DBTL is a dibutyl tin dilaurate based catalyst commercialized under the name of TINSTAB® BL 277.

Dibasic ester is a mixture of dimethylsuccinate, dimethylglutarate and dimethyladipate.

SOLVESSO® 100 is a mixture of aromatic hydrocarbons, C9, purchased from ExxonMobil Chemicals.

BYK® 315N is a solution of polyester modified polymethyl alkyl siloxane in 2-phenoxyethanol and 2-methoxy-1-methylethyl acetate.

BYK® A 501 is a solution of foam-destroying polymers, silicone free

BYK® A 530 is a solution of foam-destroying polymers and polysiloxanes

LANKROMARK™ LE 527 is a tris-alkylphosphite based anti-oxidant

Tack free drying times were determined as follows: in a climatized environment (22° C., 60% relative humidity) a cotton ball was placed on the drying coating, a weight of 1 kg was placed on the cotton ball for 10 seconds, the weight was removed and the cotton ball was blown away. This procedure was repeated as function of time after applying the crosslinkable composition. The coating was said to be tack free when the cotton ball did not leave any marks. This time was recorded as the tack free time.

For determination of pot-life and working time, the viscosity of the reacting paint before spraying was measured in time with a DIN Flow Cup 4 according to DIN 53211 and is indicated in seconds. The working time (+2) is the time required until the viscosity was increased with 2 seconds relative to the initial viscosity. The working time (+4) is the time required until the viscosity was increased with 4 seconds relative to the initial viscosity. The pot-life is the time required until the viscosity was doubled relative to the initial viscosity.

Persoz hardness was measured in a climatized room at 23° C., and 55+/−5% relative humidity. Hardness was measured with a pendulum acc. Persoz as described in ASTM D 4366.

Shore D hardness was determined according to ISO 868 2003.

Examples 1 to 4 and Comparative Examples C1 and C2

Clearcoat formulations were prepared by preparing the 2 components as shown in Table 1 and then mixing them. The quantities are specified in gram. For each of the compositions, the NCO/OH ratio was kept constant at 1.1 and the level of DBTL catalyst was 0.075% on total resin solids (non-volatile part of resin A+isocyanate component) for all formulations. Four tertiary acids were tested (Examples 1-4) and compared to a primary acid and a conjugated acid (Examples C1 and C2), all at equal molar levels and at equal molar concentration.

The formulations were applied on glass by draw-down application at equal dry layer thickness and left to dry at room temperature. Tack-free time was determined; Persoz hardness after 1 day RT was measured as well as pot-life and working time.

TABLE 1*

| Example | 1 | 2 | 3 | 4 | C1 | C2 |
|---|---|---|---|---|---|---|
| Component 1 | | | | | | |
| Resin A | 89.3 | 89.3 | 89.3 | 89.3 | 89.3 | 89.3 |
| Dibasic ester | 0.9 | 0.9 | 0.9 | 0.9 | 0.9 | 0.9 |
| Butyl acetate | 10.9 | 11.1 | 14.3 | 8.7 | 11.4 | 7.4 |
| Solvesso 100 | 5.8 | 5.8 | 5.8 | 5.8 | 5.8 | 5.8 |
| Tinuvin 1130 | 1.5 | 1.5 | 1.5 | 1.5 | 1.5 | 1.5 |
| Tinuvin 292 | 0.5 | 0.5 | 0.5 | 0.5 | 0.5 | 0.5 |
| BYK-315N | 0.5 | 0.5 | 0.5 | 0.5 | 0.5 | 0.5 |
| DBTL** | 7.5 | 7.5 | 7.5 | 7.5 | 7.5 | 7.5 |
| Abietic acid$^a$ | 6.61 | | | | | |
| 2,2-dimethylbutyric acid$^\#$ | | 8.37 | | | | |
| 1-methyl-1-cyclohexanecarboxylic acid$^b$ | | | 2.05 | | | |
| 2,2-dimethylpropionic acid$^\#$ | | | | 7.36 | | |
| Acetic acid$^\#$ | | | | | 4.33 | |
| Benzoic acid$^\#$ | | | | | | 8.80 |
| Component 2 | | | | | | |
| Tolonate HDT-LV | 32.6 | 32.6 | 32.6 | 32.6 | 32.6 | 32.6 |
| Butyl acetate | 7.7 | 7.7 | 7.7 | 7.7 | 7.7 | 7.7 |
| Xylene | 15.4 | 15.4 | 15.4 | 15.4 | 15.4 | 15.4 |

*all values are in grams/
**1% solution by weight in butyl acetate/
$^\#$10% solution by weight in butyl acetate/
$^a$33% solution by weight in butyl acetate/
$^b$50% solution by weight in butyl acetate.

The results are displayed in Table 2. The pot-life-drying ratio is the ratio between the pot-life and the tack-free time measured as specified here above.

The data clearly show that the compositions according to the invention show much improved pot-life-drying ratio, working time and early hardness compared to the compositions of comparative example C1. Furthermore, the compositions according to the invention show very much improved pot-life-drying ratio with a similar or improved working time and similar or improved early hardness compared to the composition of comparative example C2. In conclusion, the data in Table 2 show that the compositions according to the invention are a significant improvement and result in better-balanced coatings.

TABLE 2

| | 1 | 2 | 3 | 4 | C1 | C2 |
|---|---|---|---|---|---|---|
| Pot-life-drying ratio | 0.77 | 0.85 | 0.81 | 0.68 | 0.51 | 0.43 |
| Working time (+2) (min) | 43 | 40 | 28 | 18 | 12 | 18 |
| Persoz hardness* | 206 | 213 | 231 | 205 | 189 | 216 |

*hardness after 1 day; curing at ambient temperature

Examples 5 and 6 and Comparative Examples C3 and C4

Similarly to the examples here above, compositions were prepared which included besides tertiary acids also C—(CH$_2$OC(=O)CH$_2$CH$_2$SH)$_4$ as complexing agent e). Clearcoat formulations were prepared as shown in Table 3. The NCO/OH ratio was kept constant at 1.1 and the level of DBTL catalyst was 0.15% on total resin solids (resin A+isocyanate component) for all formulations. Four tertiary acids were tested (Examples 5-6) and compared to a primary acid and a conjugated acid (Examples C3 and C4), all at equal molar levels and at equal molar concentration. The formulations were applied on glass by draw-down application at equal dry layer thickness and left to dry at room temperature. Tack-free time was determined and Persoz hardness 1 hour after 30 min 60° C. curing was measured. Furthermore, working time (+2) and working time (+4) were determined.

TABLE 3*

| | 5 | 6 | C3 | C4 |
|---|---|---|---|---|
| Component 1 | | | | |
| Resin A | 89.3 | 89.3 | 89.3 | 89.3 |
| Dibasic ester | 0.9 | 0.9 | 0.9 | 0.9 |
| Butyl acetate | 15.3 | 15.2 | 15.6 | 8.2 |
| Solvesso 100 | 5.8 | 5.8 | 5.8 | 5.8 |
| Tinuvin 1130 | 1.5 | 1.5 | 1.5 | 1.5 |
| Tinuvin 292 | 0.5 | 0.5 | 0.5 | 0.5 |
| BYK-315N | 0.5 | 0.5 | 0.5 | 0.5 |
| DBTL** | 1.5 | 1.5 | 1.5 | 1.5 |
| C—(CH$_2$OC(=O)CH$_2$CH$_2$SH)$_4$** | 0.6 | 0.6 | 0.6 | 0.6 |
| Acetic acid$^a$ | | | 0.86 | |
| Benzoic acid* | | | | 8.71 |
| 2,2-dimethylpropionic acid$^a$ | 1.46 | | | |
| 2,2-dimethylbutyric acid$^a$ | | 1.66 | | |
| Component 2 | | | | |
| Tolonate HDT-LV | 32.6 | 32.6 | 32.6 | 32.6 |
| Butyl acetate | 7.7 | 7.7 | 7.7 | 7.7 |
| Xylene | 15.4 | 15.4 | 15.4 | 15.4 |

*all values are in grams
**10% solution by weight in butyl acetate
$^a$50% solution by weight in butyl acetate The results are displayed in Table 4. The working time (+4)/drying time ratio is the ratio between the working time (+4) and the tack-free time measured as specified here above.

The data clearly show that the compositions according to the invention show much improved working time and early hardness compared to comparative example C3. Furthermore, the compositions according to the invention show very much improved working time (+4)-drying time ratio, improved working time and similar early hardness compared to comparative example C4. In conclusion, the data in Table 4 show that the examples according to the invention are a significant improvement and result in better-balanced coatings.

TABLE 4

|  | 5 | 6 | C3 | C4 |
|---|---|---|---|---|
| Working time (+4)/drying time ratio | 0.51 | 0.51 | 0.49 | 0.40 |
| Working time (+2) (min) | 29 | 36 | 25 | 29 |
| Persoz hardness* | 161 | 158 | 149 | 164 |

*hardness 1 hour after 30 min 60° C.

Examples 7 and 8 and Comparative Examples C5-C7

Comparative examples C5-C7 and Examples 7-8 demonstrate that the composition according to the present invention is also beneficial in pigmented systems as well as in other applications. All ingredients from Component 1 in Table 5 were added together and milled until the particle size was <10 µm. The mixture was left under vacuum to deaerate. Component 2 was added, mixed and the curable mixture was poured and levelled. Shore hardness was determined and appearance was judged visually.

TABLE 5*

|  | 7 | 8 | C5 | C6 | C7 |
|---|---|---|---|---|---|
| Component 1 |  |  |  |  |  |
| Setathane D 1150 | 127.06 | 126.25 | 125.63 | 125.53 | 124.75 |
| 2,2-dimethylpropanoic acid | 2.28 |  |  |  |  |
| 3-Hydroxy-2,2-dimethylpropanoic acid |  | 2.63 |  |  |  |
| 2-Ethylhexanoic acid |  |  | 3.19 |  |  |
| Isononanoic acid |  |  |  | 3.5 |  |
| Nouracid LE80 |  |  |  |  | 6.12 |
| Finmasorb 430 | 24.84 | 24.96 | 25.02 | 25.00 | 24.82 |
| Barytes EWO | 133.83 | 134.47 | 134.78 | 134.67 | 133.71 |
| R-KB-2 | 20.49 | 20.59 | 20.64 | 20.62 | 20.48 |
| BYK A 501 | 1.05 | 1.05 | 1.05 | 1.05 | 1.04 |
| BYK A 530 | 0.63 | 0.63 | 0.63 | 0.63 | 0.63 |
| n-$C_{12}H_{25}SH$ | 0.24 | 0.24 | 0.24 | 0.24 | 0.24 |
| 2% DBTL solution in Castor Oil | 7.62 | 7.58 | 7.53 | 7.53 | 7.48 |
| Component 2 |  |  |  |  |  |
| Tolonate HDT-LV2 | 81.95 | 82.19 | 101.34 | 81.01 | 81.60 |

*all values are in grams

In some application such as flooring applications, use of lower molecular weight acids such as acetic acid is undesired because of the relatively high vapour pressure, requirement of near-zero VOC and smell. Therefore, other acids were tested as comparative example with much higher boiling point. Again, the data in Table 6 show that use of the tertiary acids of the present invention resulted in much better balanced coatings, i.e. a higher Shore D hardness and better appearance compared to the Comparative examples containing primary or secondary acids.

TABLE 6

|  | 7 | 8 | C5 | C6 | C7 |
|---|---|---|---|---|---|
| Shore D hardness after 48 h | 40 | 42 | 35 | 35 | 36 |
| Appearance | + | ++ | -- | - | +/- |

Example 9

A composition (Resin B) was prepared by mixing 410.3 g of Resin A, 6.14 g of a 10 wt % solution of C—($CH_2OC(=O)CH_2CH_2SH)_4$ in butyl acetate, 28.01 g of a 10 wt % solution of 2,2-dimethylpropionic acid by weight in butyl acetate and 1.97 g of anti-oxidant LANKROMARK™ LE 527.

50% by weight of this Resin B was then further mixed with the other ingredients of Component 1 as mentioned in Table 7 and then mixed with Component 2 and tested in the same way as Example 5. Results for t=0 are shown in Table 8.

The other 50% by weight of Resin B was stored in a closed container at 50° C. for 1 month and then mixed with the other ingredients of Component 1 (Table 7) and then mixed with Component 2 (Table 7) and tested in the same way. Results were obtained which were similar compared to the results obtained for Resin B at t=0.

This Example 9 shows that the binders according to the invention are stable and maintain their properties even after long time storage.

TABLE 7

|  | 9 |
|---|---|
| Component 1 |  |
| Resin B | 223.2 |
| Tinuvin 1130 | 3.8 |
| Tinuvin 292 | 1.3 |
| Byk-315N | 1.2 |
| DBTL (10% in butyl acetate) | 3.8 |
| Dibasic ester | 2.2 |
| Xylene | 25.7 |
| Butyle acetate | 19.9 |
| Component 2 |  |
| Tolonate HDT-LV | 88.3 |
| Xylene | 37.8 |

TABLE 8

|  | 9 (t = 0) | 9 (after 1 month 50° C.) |
|---|---|---|
| Pot-life - drying ratio | 1.5 | 1.5 |
| Working time (+2) (min) | 61 | 62 |

The invention claimed is:
1. A non-aqueous crosslinkable composition comprising
a) at least one polyol having free —OH groups,
b) at least one polyisocyanate crosslinker having free —NCO groups,
c) at least one catalyst for catalysing a reaction between —OH groups of said polyol a) and —NCO groups of said crosslinker b),
d) at least one tertiary acid of formula RR'R"CCOOH (I), wherein each R, R' and R" group, independently, is an alkyl, alkenyl, aryl or aralkyl group containing at least one carbon atom, with the proviso that two or three of the R, R' and R" groups are optionally linked to form a ring structure and wherein the R, R' and/or R" groups are optionally substituted, and wherein a total number of carbon atoms in the R, R' and R" groups is in a range of from 3 to 40, and e) optionally, at least one complexing agent containing at least one —SH group, wherein an amount of the tertiary acid d) in the composition is in a range of 0.005 to 0.5 mmol of the tertiary acid d) per gram of the polyol a).

2. The crosslinkable composition according to claim 1, wherein the complexing agent e) is present and is selected from organic compounds.

3. The crosslinking composition according to claim 2, wherein the complexing agent e) is selected from the group consisting of:

those of formula R—SH (II), wherein R is an alkyl, alkenyl, aryl or aralkyl group, optionally substituted with one or more other functional groups;

those of formula HS—$(CH_2)_x$—SH (IV), wherein x is from 1 to 20;

those of formula $(HSCH_2)_{4-m}C(CH_2SCH_2CH_2SH)_m$ (V), wherein m is from 1 to 4;

those which are reaction products of carboxylic acids of formula $HS(CH_2)_nCOOH$ (VI), wherein n is from 1 to 20, and a polyol having an OH-functionality of 2 or more;

and mixtures thereof.

4. The crosslinkable composition according to claim 1, wherein the catalyst c) comprises a metal based catalyst.

5. The crosslinkable composition according to claim 4, wherein the catalyst c) is selected from the group consisting of tin (II) carboxylates, dialkyl tin (IV) carboxylates, bismuth carboxylates, zinc carboxylates, aluminium carboxylates, and mixtures thereof.

6. The crosslinkable composition according to claim 4, wherein the complexing agent e) is present and an amount of the complexing agent e) is such that a molar equivalent of —SH groups per molar equivalent of metal from the metal based catalyst c) is in a range of 1 to 20 molar equivalents of SH per equivalent of metal.

7. The crosslinkable composition according claim 1, wherein in the tertiary acid d) having the formula RR'R"C-COOH (I), the total number of carbon atoms in the R, R' and R" groups is in the range of from 3 to 30.

8. The crosslinkable composition according to claim 7, wherein in the tertiary acid d) having the formula RR'R"C-COOH (I), R is a methyl or ethyl group, the total number of carbon atoms of groups R' and R" is from 2 to 17, and R' and/or R" is non-substituted or substituted with only one hydroxyl group.

9. The crosslinkable composition according to claim 7, wherein the tertiary acid d) is selected from the group consisting of neodecanoic acid, versatic acid, 3-hydroxy-2, 2-dimethylpropionic acid, 2,2-bis(hydroxymethyl)propionic acid, abietic acid, 1-methyl cyclohexanoic acid, dimetylmalonic acid, ethylmethylmalonic acid, diethylmalonic acid, 2,2-dimethylsuccinic acid, 2,2-diethylsuccinic acid, 2,2-dimethylglutaric acid, 2,2-dimethylpropionic acid, 2,2-dimethylbutyric acid, 2-ethyl-2-methylbutyric acid, 2,2-diethylbutyric acid, 2,2-dimethylvaleric acid, 2-ethyl-2-methylvaleric acid, 2,2-diethylvaleric acid, 2,2-dimethylhexanoic acid, 2,2-diethylhexanoic acid, 2,2-dimethyloctanoic acid, 2-ethyl-2,5-dimethylhexanoic acid, 3-methylisocitric acid, 4,4-dimethylaconitic acid, 1-methylcyclopentane carboxylic acid, 1,2,2-trimethyl-1,3-cyclopentane dicarboxylic acid, 1-methylcyclohexane carboxylic acid, 2-methylbicyclo[2.2.1]-5-heptene-2-carboxylic acid, 2-methyl-7-oxabicyclo[2.2.1]-5-heptene-2-carboxylic acid, 1-adamantane carboxylic acid, bicyclo[2.2.1]heptane-1-carboxylic acid, bicyclo[2.2.2]octane-1-carboxylic acid, and mixtures thereof.

10. The crosslinkable composition according to claim 1, wherein the polyol a) is selected from the group consisting of polyester polyols, polyacrylate polyols, polycarbonate polyols, polyether polyols, polyurethane polyols, melamine polyols, and mixtures and hybrids thereof, and has a hydroxyl value in a range of 20 to 1,000 mg KOH per gram of polyol and an acid value of 15 mg KOH per gram of polyol or less.

11. The crosslinkable composition according to claim 1 comprising from 10 to 90% of weight of polyol a), from 10 to 90% of weight of polyisocyanate crosslinker b), from 0.001 to 10% of weight of catalyst c)

from 0.001 to 10% of weight of tertiary acid d), optionally, from 0.001 to 1% of weight of complexing agent e), optionally, from 0.05 to 1.5% of weight of an anti-oxidant f1), and optionally, from 0.05 to 1.5% of weight of a radical scavenger f2), based on a total amount of polyol a), crosslinker b), catalyst c), tertiary acid d) and, if present, complexing agent e) and/or anti-oxidant f1) and/or radical scavenger f2).

12. The crosslinkable composition according to claim 1, comprising primary and/or secondary acids in addition to the tertiary acids d) in a range of 1 to 100 mol % of the quantity of the tertiary acids.

13. A kit of parts for preparing the crosslinkable composition according to claim 1, comprising:

i. a binder module comprising at least one polyol a) and at least one tertiary acid d), and optionally at least one catalyst c) and/or complexing agent e) and/or an anti-oxidant f1) and/or a radical scavenger f2), and ii. a crosslinker module comprising at least one polyisocyanate crosslinker b), wherein an amount of the tertiary acid d) in the binder module is such that the prepared crosslinkable composition contains 0.005 to 0.5 mmol of the tertiary acid d) per gram of the polyol a).

14. A binder module for preparing the crosslinkable composition according to claim 1, said binder module comprising at least one polyol a) and at least one tertiary acid d) and, optionally, at least one complexing agent e), at least one anti-oxidant f1) and/or at least one radical scavenger f2), wherein an amount of the tertiary acid d) in the binder module is such that the prepared crosslinkable composition contains 0.005 to 0.5 mmol of the tertiary acid d) per gram of the polyol a).

15. A method of providing a coating comprising the steps of applying the crosslinkable composition according to claim 1 to at least a part of an object, and curing the applied composition.

16. The crosslinkable composition according to claim 3, wherein the one or more other functional groups are selected from the group consisting of hydroxyl groups, primary, secondary or tertiary amine groups, silane or siloxane groups, ether groups, ester groups, and carboxylic acid groups.

17. The crosslinkable composition according to claim 4, wherein the metal of the metal based catalyst is selected from the group consisting of tin, bismuth, zinc, zirconium, aluminium, and mixtures thereof.

18. The crosslinkable composition according to claim 5, wherein the catalyst c) is selected from the group consisting of dialkyl tin dicarboxylates, bismuth carboxylates, zinc carboxylates, and mixtures thereof.

19. The cross-linkable composition according to claim 18, wherein the catalyst c) is selected from the group consisting of dimethyl tin dilaurate, dimethyl tin diversatate, dimethyl tin dioleate, dibutyl tin dilaurate, dioctyl tin dilaurate, tin octoate, zinc 2-ethylhexanoate, zinc neodecanoate, bismuth 2-ethylhexanoate, bismuth neodecanoate, and mixtures thereof.

20. The crosslinkable composition according to claim 18, wherein the catalyst c) is selected from the group consisting of dibutyl tin dilaurate, dioctyl tin dilaurate, zinc 2-ethylhexanoate, and mixtures thereof.

21. The method according to claim 15, wherein said part of an object is a surface of a transportation vehicle.

22. The method according to claim 15, wherein the curing is conducted in a temperature range of 5 to 180° C.

23. The crosslinkable composition according to claim 1, prepared by a process comprising mixing:
   i. a binder module comprising
      from 30 to 95% of weight of polyol a), and
      from 0.05 to 12% of weight of tertiary acid d), and optionally
      from 0.001 to 10% of weight of catalyst c), and/or
      from 0.001 to 1% of weight of complexing agent e), and/or
      from 0.1 to 3% of at least one antioxidant f1), and/or
      from 0.1 to 3% of at least one radical scavenger f2),
    based on a total amount of polyol a), tertiary acid d) and, if present, catalyst c), and/or complexing agent e), and/or anti-oxidant f1), and/or radical scavenger f2) in the binder module, and
   ii. a crosslinker module comprising at least one polyisocyanate crosslinker b).

24. The crosslinkable composition according to claim 1, comprising a binder module, said binder module comprising
   from 30 to 95% of weight of polyol a), and
   from 0.05 to 12% of weight of tertiary acid d), and optionally,
      from 0.001 to 10% of weight of catalyst c), and/or
      from 0.001 to 1% of weight complexing agent e), and/or
      from 0.1 to 3% at least one anti-oxidant f1), and/or
      from 0.1 to 3% of at least one radical scavenger f2),
   based on a total amount of polyol a), tertiary acid d) and, if present, catalyst c), and/or complexing agent e), and/or anti-oxidant f1), and/or radical scavenger f2) in the binder module.

* * * * *